United States Patent
Lin et al.

(10) Patent No.: US 10,046,651 B2
(45) Date of Patent: Aug. 14, 2018

(54) ENERGY MANAGEMENT STRATEGY FOR BOATS AND SHIPS

(71) Applicant: Ship and Ocean Industries R&D Center, New Taipei (TW)

(72) Inventors: Chih-Hung Lin, New Taipei (TW); Hung-Hsi Lin, New Taipei (TW); Sheng-Hua Chen, New Taipei (TW); Jen-Fu Tsai, New Taipei (TW); Hsiao-Yu Hsu, New Taipei (TW); Shean-Kwang Chou, New Taipei (TW); Kai-Ping Hsu, New Taipei (TW)

(73) Assignee: SHIP AND OCEAN INDUSTRIES R&D CENTER, New Taipei (TW)

(*) Notice: Subject to any disclaimer, the term of this patent is extended or adjusted under 35 U.S.C. 154(b) by 43 days.

(21) Appl. No.: 14/977,634

(22) Filed: Dec. 21, 2015

(65) Prior Publication Data
US 2017/0087996 A1    Mar. 30, 2017

(30) Foreign Application Priority Data
Sep. 24, 2015 (TW) .............................. 104131561 A (51) Int. Cl.
*B60L 11/18* (2006.01)
*G01C 21/20* (2006.01)
*B60W 20/13* (2016.01)
*B63B 49/00* (2006.01)
(Continued)

(52) U.S. Cl.
CPC ....... *B60L 11/1809* (2013.01); *B60L 11/1862* (2013.01); *B60W 20/13* (2016.01); *B63B 49/00* (2013.01); *B63H 21/20* (2013.01); *G01C 21/203* (2013.01); *B60L 2200/32* (2013.01); *B60L 2240/62* (2013.01); *B60L 2240/66* (2013.01); *B60W 2300/00* (2013.01); *B60W 2510/244* (2013.01); *B60W 2550/12* (2013.01); *B63B 2755/00* (2013.01); *B63H 2021/202* (2013.01); *B63J 2099/006* (2013.01);
(Continued)

(58) Field of Classification Search
CPC .............. B60L 11/1809; B60L 11/1862; B60L 2200/32; B60L 2240/62; B60L 2240/66; B63B 49/00; B63H 21/20; B63H 2021/202; G01C 21/203; Y10S 903/907; B60W 2300/00; B60W 2510/244; B60W 2550/12; B60W 20/13
See application file for complete search history.

(56) References Cited

U.S. PATENT DOCUMENTS

| | | | |
|---|---|---|---|
| 5,863,228 A * | 1/1999 | Tether | B60L 8/00 440/3 |
| 6,336,063 B1 * | 1/2002 | Lennevi | B60K 6/28 180/65.1 |

(Continued)

*Primary Examiner* — Khoi H Tran
*Assistant Examiner* — Majdi Alsomiri
(74) *Attorney, Agent, or Firm* — Cheng-Ju Chiang (57) ABSTRACT

An energy management strategy for boats and ships is provided. The aforementioned strategy comprises a strategy for low-load conditions and a strategy for high-load conditions, specifically for the sailing conditions of boats and ships. The output and distribution of energy are dynamically adjusted in accordance with commands, tides, time, locations, weather, hydrologic conditions and other factors may impact the sailing, in order to optimize the energy efficiency of boats and ships.

12 Claims, 8 Drawing Sheets

(51) Int. Cl.
*B63H 21/20* (2006.01)
*B63J 99/00* (2009.01)

(52) U.S. Cl.
CPC ............ *Y02T 70/5236* (2013.01); *Y02T 70/74* (2013.01); *Y10S 903/907* (2013.01)

(56) References Cited

U.S. PATENT DOCUMENTS

| | | | | |
|---|---|---|---|---|
| 8,062,081 | B2* | 11/2011 | Barrett | B63H 21/20 440/1 |
| 8,727,820 | B2* | 5/2014 | Stasolla | B63H 21/20 440/3 |
| 8,996,227 | B2* | 3/2015 | Sisk | B60L 11/12 701/22 |
| 9,061,599 | B2* | 6/2015 | Sisk | B60L 11/1864 |
| 9,096,209 | B2* | 8/2015 | Kim | B60W 10/06 |
| 2006/0142915 | A1* | 6/2006 | Isono | B60K 6/46 701/36 |
| 2008/0182466 | A1* | 7/2008 | Wegner-Donnelly | B63H 23/24 440/84 |
| 2009/0125173 | A1* | 5/2009 | Komatsu | B60K 6/445 701/22 |
| 2009/0242288 | A1* | 10/2009 | Oyobe | B60L 11/123 180/65.265 |
| 2011/0115439 | A1* | 5/2011 | Kim | H01M 10/443 320/136 |
| 2012/0083173 | A1* | 4/2012 | McMillan | B63H 21/20 440/6 |
| 2015/0005998 | A1* | 1/2015 | Choi | B60L 11/1862 701/22 |

* cited by examiner

ENERGY MANAGEMENT STRATEGY FOR BOATS AND SHIPS

CROSS-REFERENCE TO RELATED APPLICATION AND CLAIM OF PRIORITY

This application claims the benefit of Taiwanese Patent Application No. 104131561, filed on Sep. 24, 2015, in the Taiwan Intellectual Property Office, the disclosure of which is incorporated herein in its entirety by reference.

TECHNICAL FIELD

At least one embodiment of the present invention relates to an energy management strategy for boats and ships. More particularly, the energy management strategy is to switch between a strategy for low-load conditions and a strategy for high-load conditions to offer optimized energy efficiency.

DESCRIPTION OF THE RELATED ART

The importance of energy distribution and energy management has been emphasized since the invention of hybrid power systems. Numerous inventions related to energy managements were then proposed for dual power systems and hybrid power systems.

Most of the inventions are designed to be applied on land vehicles. Though some of the inventions were also applied to boats and ships directly without modifications, the results, however, show low efficiency and large quantify of energy waste in boats and ships.

The energy managements for land vehicles were applied to ships because land vehicles and ships share some similarity. The operations of land vehicles and ships both use accelerators and clutches to control the movement. However, some differences are identified herein. The energy managements for land vehicles are optimized for situations including climbing, descending, and braking and considering factors such as loads and friction. These are rarely considered as the priority for ships.

On water, loads take much less effect on ships than the vehicles on lands, because the water provides buoyancy to support ships. The resistances received during moving are also different between land vehicles and ships. For a land vehicle, the resistance and the velocity are in a linear relationship; as for a ship, the resistance and the velocity are in an exponential relationship. Therefore, the energy managements for land vehicles and ships are facing different problems reflecting the operating environments.

Moreover, both the weather in the sky and the water underneath are varying drastically. The energy managements for land vehicles are therefore not suitable for being applied to ships. Even with the fuzzy logic, the energy managements for land vehicles are still hard to adapt the variety of water. Applying probability to energy managements are merely a generic method rather than a customized method for energy management for ships.

SUMMARY

At least one embodiment of the present invention provides an energy management strategy for boats and ships to solve the aforementioned problems. The energy management strategy for boats and ships comprises a strategy for low-load conditions and a strategy for high-load conditions. The strategy for low-load conditions runs a first operation mode based on a first state of charge and a second state of charge. In contrast, the strategy for high-load conditions runs a second operation mode based on the first state of charge, the second state of charge, a third state of charge, and a threshold.

More particularly, the first state of charge is higher than the third state of charge and the third state of charge is higher than the second state of charge. The strategy for low-load conditions and the strategy for high-load conditions are inter-switchable. The strategy for high-load conditions is automatically selected if the energy required for the ship has been reaching the threshold for a first period and the strategy for low-load conditions is automatically selected if the strategy for high-load conditions has been running for a second period.

At least one embodiment of the present invention provides a method of controlling energy management for boats and ships. The method comprises a step of selecting a mode by a user on a ship, and then a step of selecting a hybrid mode for the mode, and further with a step of determining a model of energy distribution by a controller on the ship.

More particularly, the model of energy distribution comprises the strategy for low-load conditions and the strategy for high-load conditions heretofore.

At least one embodiment of the present invention provides a method of planning routes for boats and ships. The method comprises a step of selecting a start site and a stop site by a processor of a ship, then a step of proposing multiple routes by the processor, further with a step of simulating the operation of the energy management strategy for boats and ships for each route by the processor, and a step of selecting the route with most ideal simulating result from the multiple routes and displaying the route on a display by the processor.

DESCRIPTION OF THE PREFERRED EMBODIMENTS

The examples depicted in the following section are provided for the purpose of detailed explanation of the features of preferred embodiments, in order to enable one having ordinary skill in the art to understand the preferred embodiments.

Figure 1A:
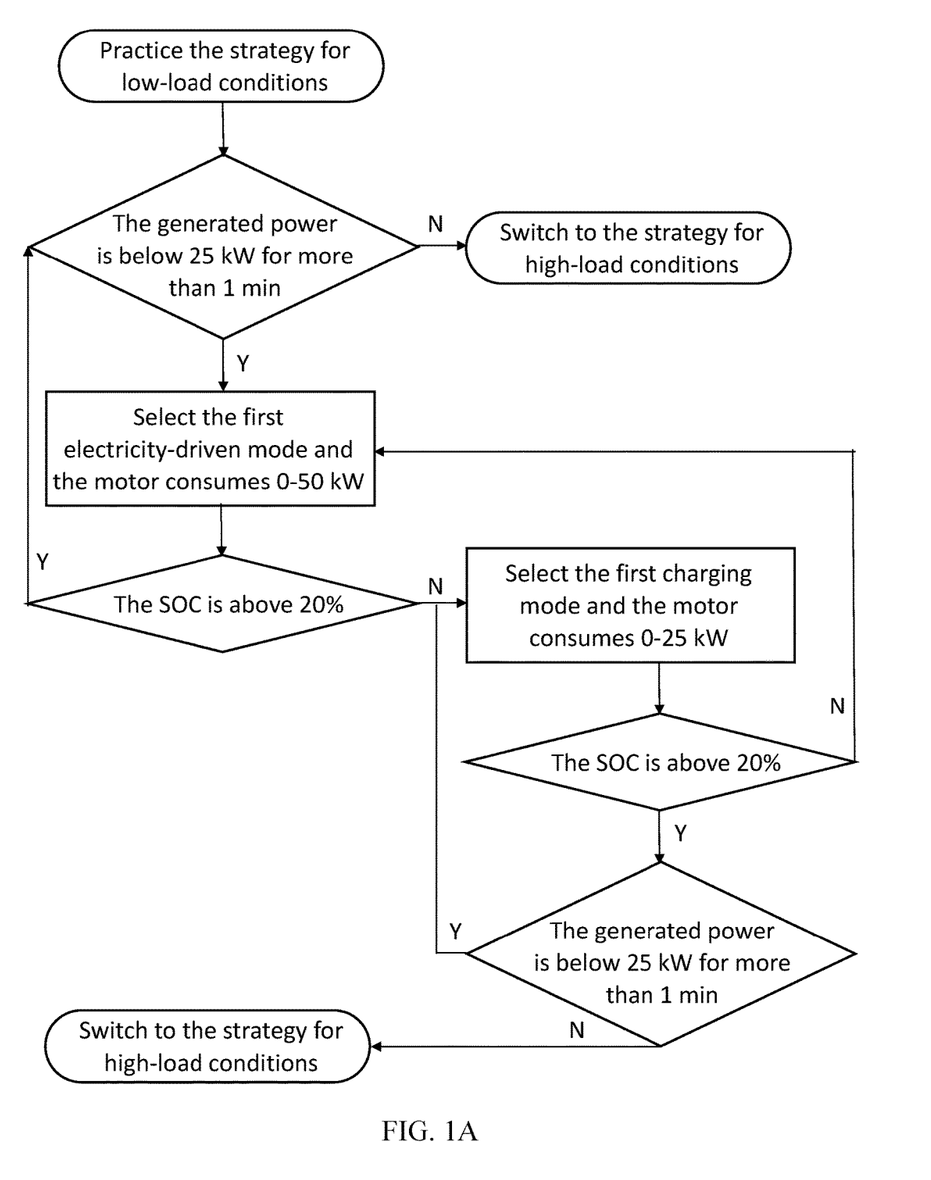
FIG. 1A is a flowchart illustrating operation of the strategy for low-load conditions, according to an energy management strategy for boats and ships in some embodiments of the present invention.
Figure 1B:
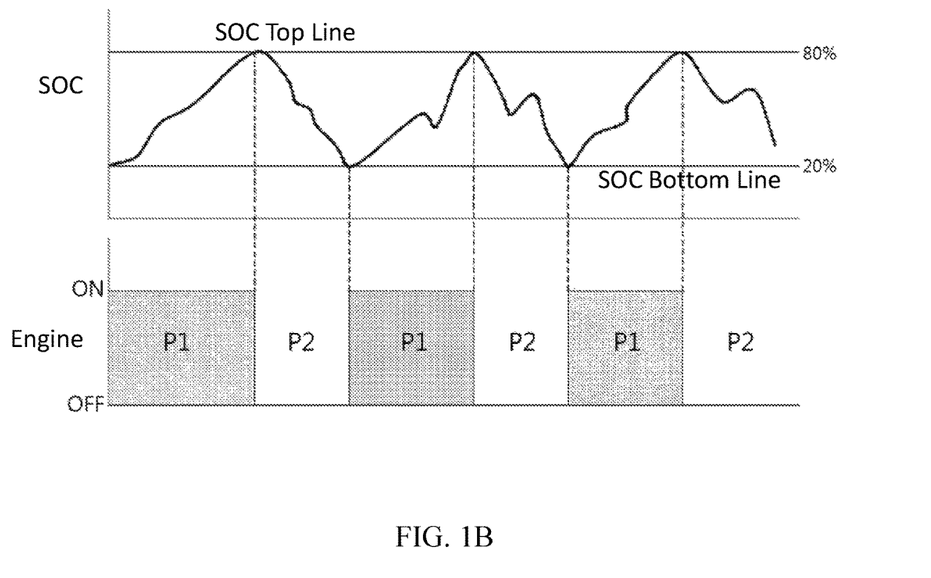
FIG. 1B is a diagram illustrating the energy distribution during operating the strategy for low-load conditions, according to an energy management strategy for boats and ships in some embodiments of the present invention.
Figure 1C:
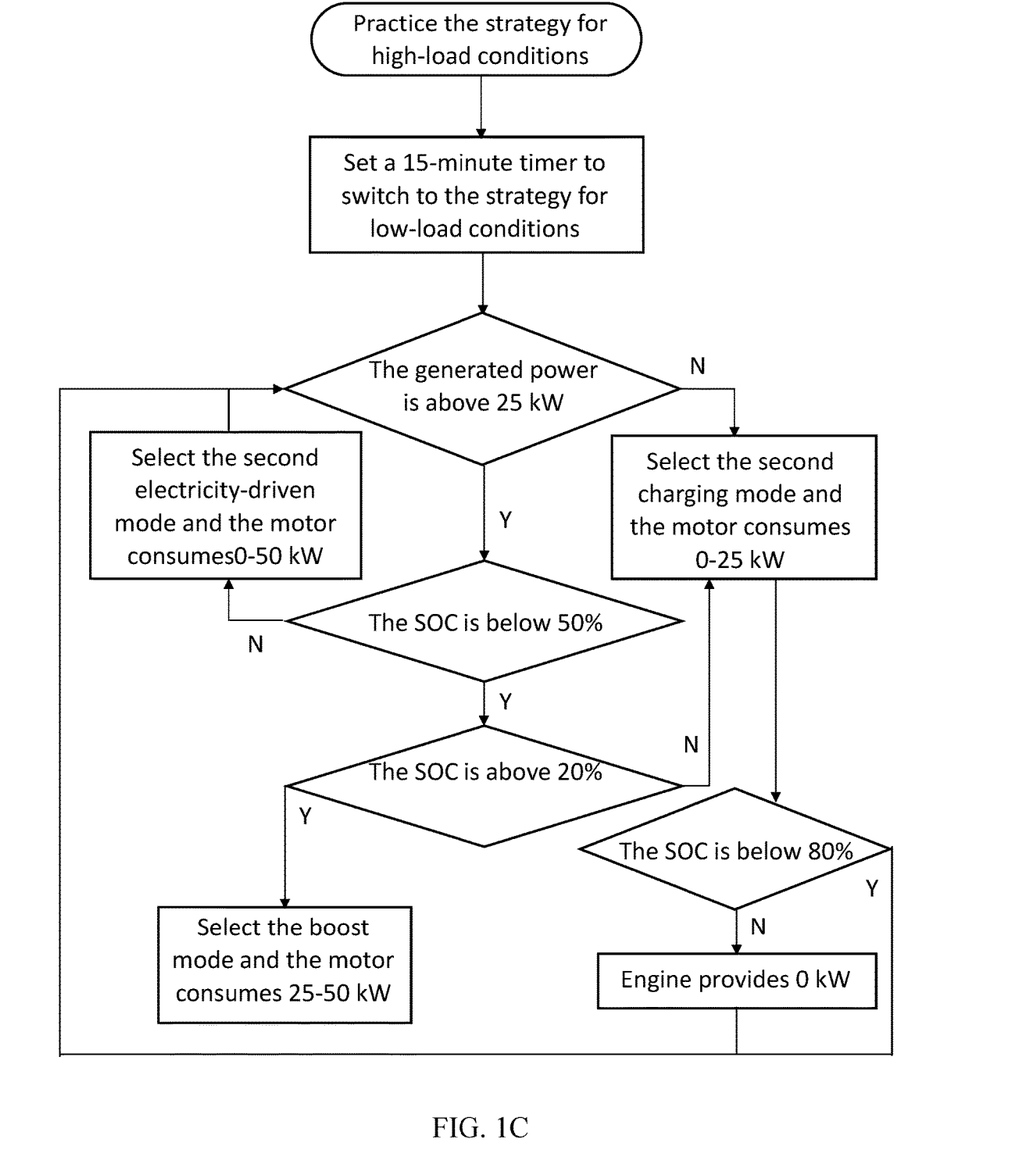
FIG. 1C is a flowchart illustrating operation of the strategy for high-load conditions, according to an energy management strategy for boats and ships in some embodiments of the present invention.
Figure 1D:
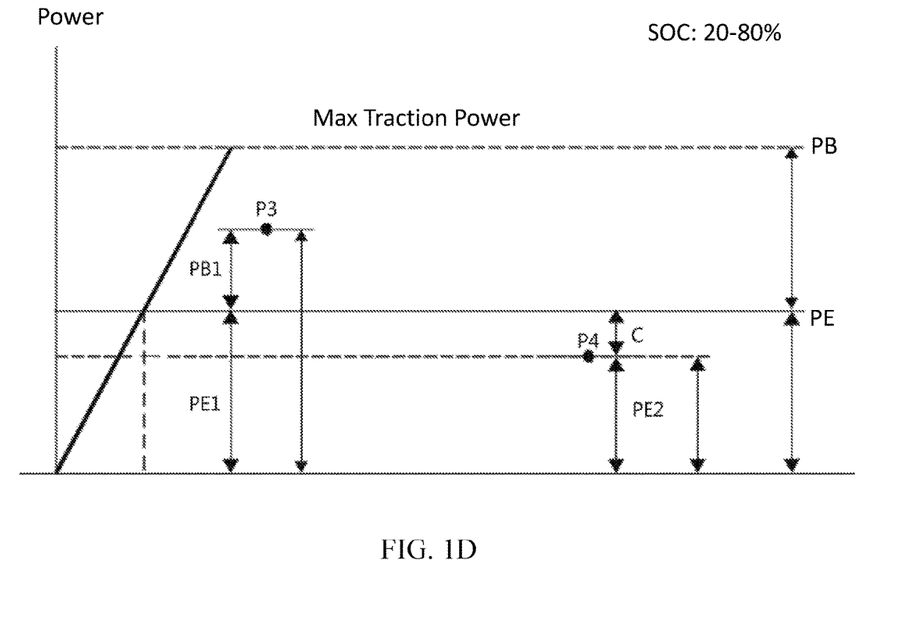
FIG. 1D is a diagram illustrating the energy distribution during operating the strategy for high-load conditions, according to an energy management strategy for boats and ships in some embodiments of the present invention.
Figure 4:
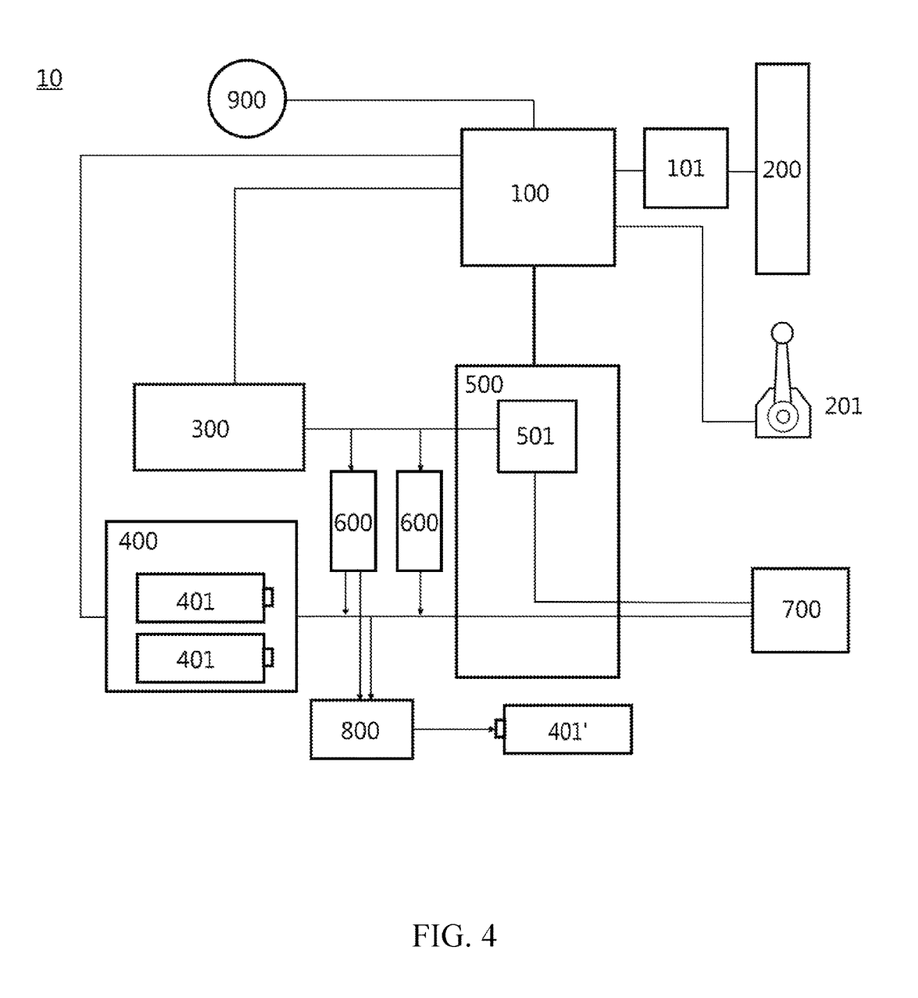
FIG. 4 is a schematic diagram illustrating a power system for boats and ships, according to some embodiments of the present invention.

FIG. 1A is a flowchart illustrating operation of the strategy for low-load conditions, according to an energy management strategy for boats and ships in some embodiments of the present invention; FIG. 1B is a diagram illustrating the energy distribution during operating the strategy for low-load conditions, according to an energy management strategy for boats and ships in some embodiments of the present invention; FIG. 1C is a flowchart illustrating operation of the strategy for high-load conditions, according to an energy management strategy for boats and ships in some embodiments of the present invention; and FIG. 1D is a diagram illustrating the energy distribution during operating the strategy for high-load conditions, according to an energy management strategy for boats and ships in some embodiments of the present invention. Referring to FIG. 4, the power system for boats and ships 10 illustrated in FIG. 4 comprises an electric generator 300, multiple chargers 600, a battery manage system 400, an inverter 500, a motor 700, a controller 100, a DC/DC converter 800, multiple sensors 900, and a processor 101.

More particularly, the multiple chargers 600 are connected with the electric generator 300. The battery manage system 400 contains multiple batteries 401, in which the multiple batteries 401 are also connected with the multiple chargers 600. In contrast, the inverter 500 comprises a rectifier 501, in which the inverter 500 is further connected with the multiple batteries 401 and the electric generator 300 respectively. The multiple sensors 900 are connected with the controller 100 and the motor 700 is connected with the inverter 500. As illustrated in FIG. 4, the multiple chargers 600 and the multiple batteries 401 are further connected with a battery 401' via the DC/DC converter. Differing from the multiple batteries 401, the battery 401' is a lead-acid battery.

Electricity generated by the electric generator 300 is converted to DC by the rectifier 501 in the inverter 500, and is further provided to the motor 700 with the DC outputted from the multiple batteries 401 or the battery 401'. The sensor 900 may be a gyroscope, a manometer, an anemometer, a hydrometer, a flow switch, or the combination thereof. The sensor 900 could also be a hydrologic monitoring system including bathometers, sidescan sonars, and sub-bottom profilers. The hydrologic data provided by the sensor 900 serves as references for the controller 100 to practice different strategies of energy management. The sensors 900 inform the controller 100 about the surrounding of the ship, and the controller 100 is further connected with the processor 101, a power control 201, the electric generator 300, the multiple batteries 401 and the inverter 500 respectively. In the embodiments of FIG. 4, SOC of the multiple batteries 401 are regulated by the battery management system 400. Protection ICs and other electronic units are well-known in the art of battery management systems and therefore may be also included in the battery management system 400 in accordance with design considerations.

In the power system for boats and ships 10, the processor 101 may be an industrial PC, a chip, or the combination therefore. The controller 100 may be a programmable logic controller (PLC), a microcontroller unit (MCU), or the combination thereof. The multiple batteries 401 may be selected from Li-ion batteries, Li—Po batteries, LiFePO$_4$ batteries, or the combination thereof, in accordance with the design considerations of the power system for boats and ships 10. Furthermore, the processor 101 is connected with the display 200, in which the display 200 may be LCD or LED touch screens displaying the hardware status, routes, GPS locations, and other parameters of the power system for boats and ships 10.

In some embodiments that the ship installed with the power system for boats and ships 10 is a cruise ship or a pleasure craft, the multiple batteries 401 are further connected with hotel load. The hotel load with respect to the present embodiments includes electronic devices such as cranes, pumps, dynamic positioning systems, remotely operated vehicles (ROVs), microwaves, air-conditioners, and refrigerators.

FIGS. 1A-1D are directing to energy management strategies for boats and ships, and are discussed below with reference to the power system for boats and ships 10 illustrated in FIG. 4. The energy management strategies for boats and ships mainly comprise two modules, the strategy for low-load conditions and the strategy for high-low conditions. The strategy for low-load conditions runs a first operation mode based on a first state of charge and a second state of charge.

Similarly, the strategy for high-load conditions runs a second operation mode based on the first state of charge, the second state of charge, a third state of charge, and a threshold. More particularly, the first state of charge, the second state of charge, and the third state of charge are related to the state of charge (SOC) of the multiple batteries 401. The threshold is related to the traction power of the motor 700.

In the present embodiments, the first state of charge is higher than the third state of charge and the third state of charge is higher than the second state of charge. The first state of charge, the second state of charge, and the third state of charge are set at 80%, 50%, and 20% respectively. The strategy for low-load conditions and the strategy for high-load conditions are inter-switchable. The strategy for high-load conditions is selected if the energy requirement of the ship has been exceeding the threshold (i.e., 25 kW, the traction power of motor 700) for a first period, and the strategy for low-load conditions is selected if the strategy for high-load conditions has been running for a second period.

FIGS. 1A and 1B provide information about the operation and energy distribution of the strategy for low-load conditions; FIGS. 1C and 1D provide information about the operation and energy distribution of the strategy for high-load conditions. FIGS. 1A-1D together depict the overall picture of the energy management strategy in the present embodiments.

The power system for boats and ships 10 practices the strategy for low-load conditions by default. As illustrated in FIGS. 1A and 1B, the strategy for low-load conditions mainly comprises two modes. The two modes, the first charging mode and the first electricity-driven mode, are switched based on the SOC, the first state of charge (i.e., 80%) and the second state of charge (i.e., 20%), of the multiple batteries 401. More particularly, the strategy for low-load conditions runs a first operation mode comprising the first charging mode and the first electricity-driven mode.

That is, the first electricity-driven mode is selected if the SOC of the multiple batteries 401 reaches or exceeds the first state of charge (i.e., 80%), and the first charging mode is selected if the SOC reaches or falls below the second state of charge (20%).

The Phase I P1 and Phase II P2 illustrated in FIG. 1B are used as an exemplary operation of FIG. 1A. Phase I P1 is activated when the SOC of the multiple batteries 401 hits 20%. In Phase I P1, the first charging mode is selected and an engine (i.e., the electric generator 300 in the present embodiments) is activated. The power generated by the electric generator 300 is higher than the 25 kW threshold, the traction power of the motor 700, and therefore the excess power is redirected to recharge the multiple batteries 401 or the battery 401 through the multiple chargers 600. Phase II P2 is activated when the SOC of the multiple batteries 401 reaches 80%. In Phase II P2, the first charging mode is terminated and the first electricity-driven mode is then activated to support the operation of the motor 700.

Note that the SOC of the multiple batteries 401 can be determined by either average or individual, based on design considerations.

In the present embodiments, the multiple batteries 401 are used as the primary source of electricity in the power system for boats and ships 10. In contrast, the battery 401', a lead-acid battery, is used as the alternative source of electricity in the situation of emergency to ensure high reliability of the power system for boats and ships 10.

Referring to FIGS. 1A and 1B, the power system for boats and ships 10 in the present embodiments begins with the strategy for low-load conditions. The traction power of the motor 700 for supporting the operation of the ship is examined whether is maintained below the 25 kW threshold for a first period. The first period in the present embodiments is 1 minute. One exemplary method to examine is by using pressure sensors or chips to detect the levels and operation duration of the accelerator. The first electricity-driven mode is then selected (i.e., Phase II P2), unless the traction power exceeds the 25 kW threshold for 1 minute and induces the strategy for high-load conditions.

Under the first electricity-driven mode, the power system for boats and ships 10 supplies energy to the motor 700 by the multiple batteries 401 and the traction power of the motor 700 is 0-50 kW. In the case that the multiple batteries 401 are defected, the battery 401', a lead-acid battery, is used as the alternative source of electricity to maintain the operation of the ship.

More particularly, the controller 100 regularly checks the SOC of the multiple batteries 401 or the battery 401 under the first electricity-driven mode. The time interval for checking is determined by, for example, staff on the ship or manufacturers of the ship. If the controller 100 confirms that the SOC of the multiple batteries 401 or the battery 401' is maintained above the second state of charge (i.e., 20%), the controller 100 continues the loop to examine that whether the traction power exceeds the 25 kW threshold for more than 1 minutes. At the same time, the first electricity-driven mode is keep operating unless that the power required for the ship to maintain the traction power indeed exceeds the 25 kW threshold for more than 1 minutes and the strategy for high-load conditions is induced.

The first charging mode is selected if the controller detects that the SOC of the multiple batteries 401 falls below the second state of charge (i.e., 20%). Under the first charging mode, the power system for boats and ships 10 supplies energy to the motor 700 from the electric generator 300 and the traction power of the motor 700 is 0-25 kW. Moreover, the power generated by the electric generator 300 exceeding the 25 kW threshold is used to recharge the multiple batteries 401 or the battery 401' through the multiple chargers 600.

More particularly, the controller 100 regularly checks the SOC of the multiple batteries 401 or the battery 401 under the first charging mode. If the controller 100 confirms that the SOC is no longer less than the first state of charge (i.e., 80%), the controller 100 then selects the electricity-driven mode. If the SOC is lower than 80% and the traction power has been exceeding the 25 kW threshold for more than 1 minutes, the strategy for high-load conditions will then be selected.

FIGS. 1C and 1D illustrate the strategy for high-load conditions run by the power system for boats and ships 10. Similar to the strategy for low-load conditions, the strategy for high-load conditions runs a second operation mode comprising a second charging mode, a boost mode, and a second electricity-driven mode. The strategy for high-load conditions determines modes by comparing the threshold to the SOC of the multiple batteries 401, the SOC of the battery 401, or the power generated by the electric generator 300. If the traction power of the motor 700 is lower than the threshold, then the second charging mode is selected. In contrast, if the traction power of the motor 700 is over the threshold, the SOC is further examined with the third state of charge (i.e., 50%). If examination results show that the SOC is more than the third state of charge, then the second electricity-driven mode is selected; if examination results show that the SOC is less than the third state of charge, then the SOC is further examined with the second state of charge (i.e., 20%). If examination results show that the SOC is more than the second state of charge, then the boost mode is selected; if examination results show that the SOC of the multiple batteries 401 or the battery 401' is less than the second state of charge, then the second charging mode is selected until the SOC of the multiple batteries 401 or the battery 401' reaches the first state of charge (i.e., 80%).

The operation and energy distribution of the strategy for high-load conditions is illustrated in FIG. 1D. The Phase III P3 illustrated in FIG. 1B is the boost mode. Under the boost mode, the power of the electric generator 300 (PE) is insufficient to support traction power of motor 700 to maintain the speed of the ship. Therefore, the power of the multiple batteries 401 or the battery 401' (PB) is provided to the motor 700 to maintain the speed of the ship. The boost mode is usually selected when the ship is under high-load conditions while the SOC of the multiple batteries 401 or the battery is sufficient to use. Exemplary high-load conditions include that the ship is moving against the wind or current, or the ship is operating under bad weather.

The electricity generated by the electric generator 300 is in an alternative current under the boost mode. However, the electricity generated by the multiple batteries 401 or the battery 401' is in a direct current. To merge the two currents, the alternative current is first converted to a direct current by the rectifier 501 in the inverter 500, and then combined with the direct current from the multiple batteries 401 or the battery 401' to support the motor 700.

The Phase IV P4 is the second charging mode of the strategy for high-load conditions.

Under the second charging mode, the electric generator 300 is maintained to output power at 25 kW. The inverter 500 then splits the power into two parts, a part for supporting the operation of the motor 700 (PE2) to maintain the ship at a certain speed and a part for charging the multiple batteries 401 or the battery 401'.

Referring again to FIG. 1C. FIG. 1C shows detailed operation of the strategy for high-load conditions. A timer is activated by the controller 100 to time a second period as the strategy for high-load conditions is selected. The second period in the present embodiments is 15 minutes. Then, the traction power is compared with the 25 kW threshold. If the examination results show that the traction power is lower than the threshold, then the second charging mode is selected (corresponding to Phase IV P4). In contrast, if the traction power exceeds the threshold, the SOC of the multiple batteries 401 or the battery 401' is further examined with the third state of charge (i.e., 50%).

If examination results show that the SOC of the multiple batteries 401 or the battery 401' is more than the third state of charge, then the second electricity-driven mode is selected. Under the second electricity-driven mode, all the traction power of the motor 700 is supported by the multiple batteries 401 or the battery 401' and the traction power of the motor 700 is compared to the 25 kW threshold regularly. In contrast, if examination results show that the SOC is less than the third state of charge, then the SOC is further examined with the second state of charge (i.e., 20%). If examination results show that the SOC is more than the second state of charge, then the boost mode is selected (corresponding to Phase III P3). Under the boost mode, the controller compares the power outputted by the electric generator 300 with the 25 kW threshold regularly.

If examination results show that the SOC is less than the second state of charge, then the second charging mode is selected. Under the second charging mode, the SOC of the multiple batteries 401 or the battery 401 is regularly compared to the first state of charge (i.e., 80%). If the result shows that the SOC is higher than the first state of charge, the electric generator 300 provides no power (e.g., remained at high voltage but provides 0 kW). However, if the result shows that the SOC is still under the first state of charge, then rechecks whether the traction power of the motor 700 is higher than 25 kW.

In some other embodiments, the criteria for switching between the strategy for low-load conditions and the strategy for high-load conditions may also base on other information, depending on design considerations from the manufacturers or designers of the power system for boats and ships 10. The information includes, but not limited to, a command, tide data, time data, wind direction data, location data, weather data, hydrologic data, and the combination thereof.

For example, a designer may set the criteria for switching from the strategy for low-load conditions to the strategy for high-load conditions as the traction power exceeds a threshold for 1 minutes. However, detection of commands from the accelerator representing intensive use and high frequency of upshift, hydrologic data representing moving against the current, wind direction data representing moving against the wind, weather data representing moving under a storm would lower the criteria for switching from 1 minutes to 10 seconds or even fewer. The adjusted criteria are used to provide optimized strategies. Moreover, to collect the commands, tide data, time data, wind direction data, location data, weather data, hydrologic data, and the combination thereof, corresponding sensors were configured on the ship based on the requirement.

Under the boost mode, the electric generator 300 is used to provide power to the motor 700 only when the voltage of the multiple batteries 401 is low (e.g., when the SOC is lower than the third state of charge). The strategy for high-load conditions is maintained if the electric generator 300 is generating high voltage to support the operation of the motor 700 through the multiple chargers 600. However, if the SOC further decrease to the second state of charge (i.e., 20%), the power system for boats and ships is then forced to practice the strategy for low-load conditions to charge the multiple batteries 401. In contrast, if the voltage of the multiple batteries 401 is high (e.g., when the SOC is higher than the third state of charge), the electric generator 300 is inactivated to avoid inefficient use of fuel.

Moreover, the voltage of the electric generator 300 and the multiple chargers 600 is maintained at high level and the circuit from the multiple batteries 401 to the motor 700 are disconnected if the power system for boats and ships is forced to switch to practice the strategy for high-load conditions, in order to supply power to the multiple batteries 401.

Since the SOC of the multiple batteries 401 is insufficient to maintain the practice of the strategy of high-load conditions, the strategy of low-load conditions is selected even under a high-load condition in light of the criteria. However, the strategy for low-load conditions is running at the maximum efficiency to charge the multiple batteries 401 while trying the best to spare some power to support the operation. Since the maximum power outputted by the electric generator 700 is 25 kW and the electric generator 700 is the only power source of the motor 700 in the present embodiments, the multiple chargers 600 and the controller 100 controls the energy distribution. Of the 25 kW generated by the electric generator 700, 16 kW at maximum is distributed to charge the multiple batteries 401 until the SOC is more than 30% and the strategy for high-load conditions is then selected.

In the present embodiments, an engine-driven mode is provided. The engine-driven mode uses the electric generator 300 as the only power source for the motor 300. The engine-driven mode is used when the multiple batteries 401 and the battery 401 are both defected.

Figure 2:
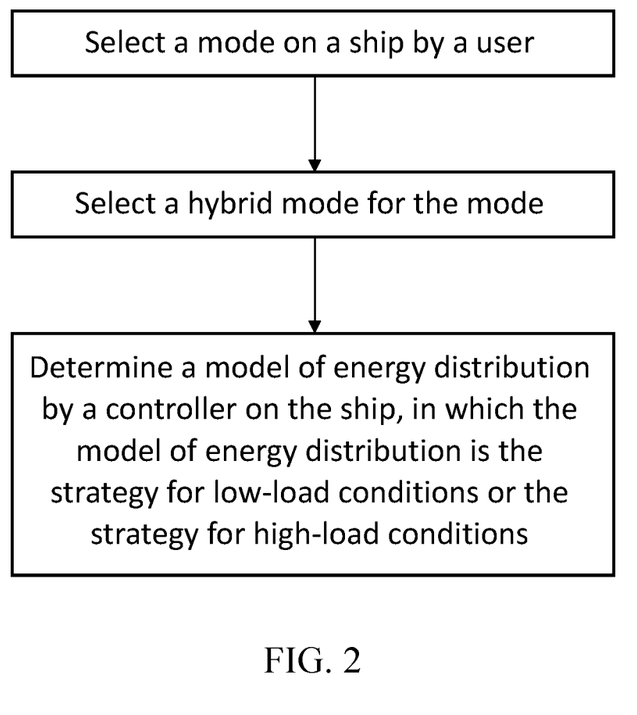
FIG. 2 is a flowchart illustrating an energy management strategy for boats and ships, according to some embodiments of the present invention.

FIG. 2 is a flowchart illustrating an energy management strategy for boats and ships, according to some embodiments of the present invention. As illustrated in FIG. 2, the first step is selecting a mode on a ship by a user. More particularly, this step is that one of the staff or a technician on the ship selects a mode of the power system for boats and ships 10 based on sailing requirements.

The next step is selecting a hybrid mode for the mode. In particular, the mode also comprises an engine-driven mode. That is, in addition to the hybrid mode which has been selected in the present embodiments, the engine-driven mode is also existed as another option for emergent situations. Under the engine-driven mode, the electric generator 300 is the only power source for the motor 700.

The following step is determining a model of energy distribution by a controller on the ship. In this step, the controller 100 determines the energy distribution based on the criteria disclosed in the energy management strategy for boats and ships heretofore. The criteria are based on commands, tide data, time data, wind direction data, location data, weather data, hydrologic data, and the combination thereof. And the model of energy distribution comprises the strategy for low-load conditions and the strategy for high-load conditions.

The criteria are based on several data. However, the criteria mostly share the same data as used in energy management strategy for boats and ships. The command is the levels and use frequency of the accelerator or the operation of the power control 201.

Unlike land vehicles, boats and ships do not comprise brakes. The commands used for determining the energy distribution would be largely different from the land vehicles. Moreover, processes applied to analyze the commands can be design by the designers based on design considerations. For example, one process can be design to analyze whether the accelerator has been used heavily for a specific period. And the activities of the accelerator can be detected by using power output sensors, pressure sensors, timers.

The tide data, time data, wind direction data, location data, weather data, and hydrologic data are to describe the surrounding. Moreover, the tide data and the hydrologic data can be deduced from the time data, the location data, and the weather data. The most important data that may affecting the operation of the power system for boats and ships 10 includes current directions, wind directions, tide heights, and the structure of the ship.

Designers of the power system for boats and ships may also include some other factors as the criteria. The factors might reflect the waterbody (e.g., lakes, rivers, and seas) that the ship may run or is running on. The factors might also include hotel loads if the ship is a cruise ship or a pleasure craft; the considerations includes the peak hours of electricity usage, and the activities of cranes, pump, dynamic positioning system, remotely operated vehicle, and other devices consuming large quantity of power.

Based on the criteria heretofore, the controller 100 therefore determines to select and practice the strategy for low-load conditions or the strategy for high-load conditions.

One embodiment that the controller 100 determines to practice the strategy for low-load conditions or high-load conditions based on the criteria set for the energy management strategy for boats and ships is disclosed as below: the controller 100 in the energy management strategy for boats and ships first detects the monsoon and the current via multiple sensors on the ship or communicate and exchange information with other detecting units (e.g., weather buoys, lighthouses, weather stations, weather balloons, or other ships); then, the controller 100 determines whether the strategy for high-load condition is applicable for the current condition, and the controllers 100 also considers the levels and usage frequency of the accelerator and the activities of the power control 201.

Figure 3A:
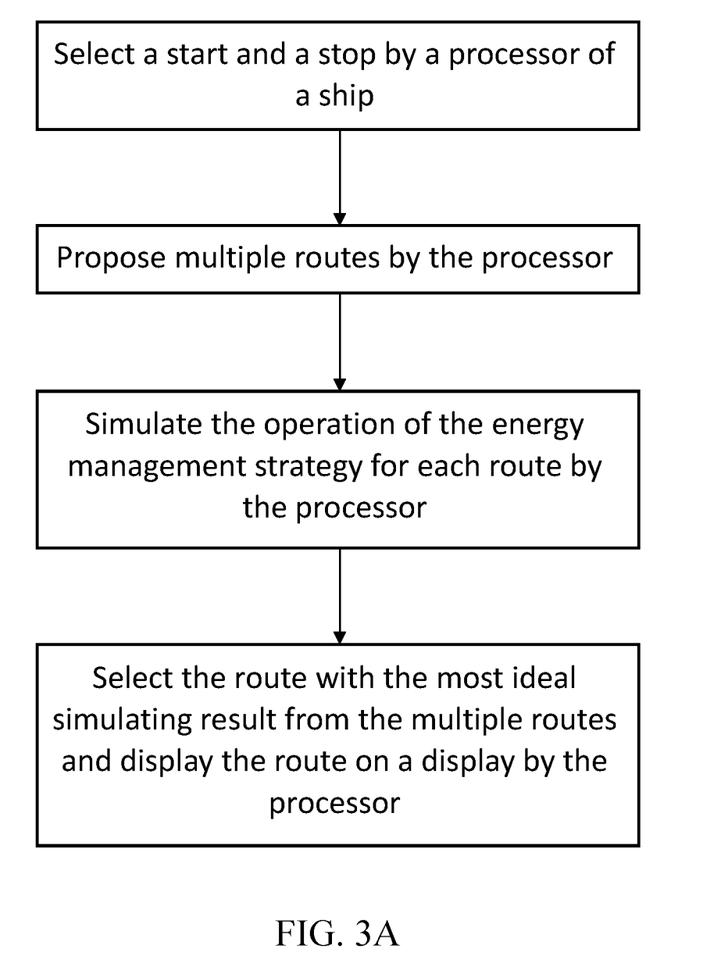
FIG. 3A is a flowchart illustrating a method of planning routes for boats and ships, according to some embodiments of the present invention.
Figure 3B:
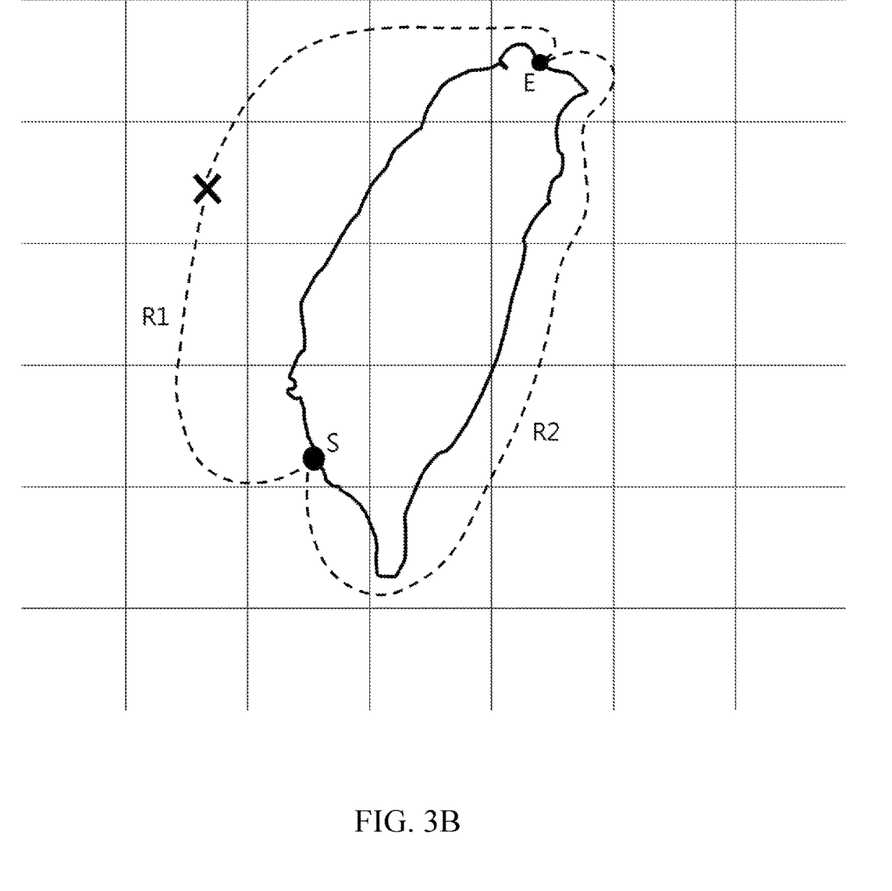
FIG. 3B is an exemplified map illustrating a method of planning routes for boats and ships, according to some embodiments of the present invention.

Referring to FIGS. 3A and 3B. FIG. 3A is a flowchart illustrating a method of planning routes for boats and ships, according to some embodiments of the present invention; FIG. 3B is an exemplified map illustrating a method of planning routes for boats and ships, according to some embodiments of the present invention. The present invention also provides a method of planning routes for boats and ships to utilize the embodiments heretofore. In the first step, a start and a stop are selected by a processor of a ship.

As illustrated in FIG. 3B, the start S and the stop E in the first step are set at harbors or landing points. The pilot may pick the start S and the stop E from, but not limited to, a library or a GPS location list in the processor 101.

In the second step, the processor 101 proposes multiples routes. More particularly, the processor 101 retrieves possible routes or the route history of other ships from a database or the internet. FIG. 3B illustrates the first route RI and the second route R2 proposed by the processor 101 and displayed on the display 200. The pilot may select a route displayed on that electronic navigational chart by touching the display 200.

A manual setup is also available for the pilot to plan the route manually if the pilot is not satisfied with the multiple routes proposed by the processor 101 in light of some needs or conditions (e.g., the monsoon or the weather). For example, the northeast monsoon and the southeast monsoon usually invade Taiwan in winter and summer respectively. Sailing north in the winter which against the monsoon may requires some other routes to minimize the impact of monsoon or may requires to force practicing the strategy for high-load conditions.

In the third step, the processor 101 simulates the operation of the energy management strategy for boats and ships (i.e., as illustrated in FIG. 1A to 1D) for each route. In the third step, the processor 101 may be an industrial PC, a chip, or the combination therefore. The processor 101 can access database or remote database via wire connection or wireless connection and therefore can simulate the operation of the energy management strategy for boats and ships and energy distribution.

On the electronic navigational chart, routes are labeled with different colors. The simulation for each route is further divided into several sections based on the grid of the electronic navigational chart.

In the fourth step, the processor 101 selects the route with the most ideal simulating result from the multiple routes and display the route on a display. More particularly, the processor 101 displays information, including the strategy suggested to practice and the possible mode might be adapted in each section, for each route, and the processor 101 further calculates the total energy consumption and the energy saved for each route. In the present embodiments, the route with the most ideal simulating result is labeled in red and the others are displayed with different colors and brightness on the display 200 based on the priorities.

After a route is selected by the pilot, the processor 101 provides navigation with voice or text. When the ship reaches the points for switching modes, the processor 101 re-determines the energy distribution based on the obtained data and the criteria and then notify the pilot using the power system for boats and ships with the updated information. For example, the X mark shown on the display 200 in FIG. 3B represents the current opposite to the sailing direction of the first route RI. When the ship is near to that area, the power system for boats and ships 10 will prepare to practice the strategy for high-load conditions.

The switching of modes, the criteria, and the hardware disclosed in the embodiments heretofore can be constructed with relays or variable-frequency drives.

There are many inventions described and illustrated above. The present inventions are neither limited to any single aspect nor embodiment thereof, nor to any combinations and/or permutations of such aspects and/or embodiments. Moreover, each of the aspects of the present inventions, and/or embodiments thereof, may be employed alone or in combination with one or more of the other aspects of the present inventions and/or embodiments thereof. For the sake of brevity, many of those permutations and combinations will not be discussed separately herein.

What is claimed is:
1. A method for controlling energy management for boats and ships, comprising:
   selecting a mode on a ship by a user;
   selecting a hybrid mode for the mode; and
   determining a model of energy distribution by a controller on the ship;
   wherein the model of energy distribution is low-load conditions or high-load conditions;
   wherein the low-load conditions comprising a controller which runs a first operation mode based on a first state of charge and a second state of charge of multiple batteries;

wherein the high-load conditions running a second operation mode based on the first state of charge, the second state of charge, a third state of charge of the multiple batteries, and a threshold;
wherein the threshold is a traction power of a motor;
wherein the first state of charge is higher than the third state of charge, and the third state of charge is higher than the second state of charge;
wherein a strategy for low-load conditions and a strategy for high-load conditions are inter-switchable via the controller;
wherein the strategy for high-load conditions is automatically selected via the controller if the power required for the ship has been reaching the threshold for a first period, and the strategy for low-load conditions is automatically selected via the controller if the strategy for high-load conditions has been running for a second period;
wherein the first period and the second period is timed by a timer;
the energy management strategy is executed by a power system installed in the ship, comprising:
an electric generator;
multiple chargers, connecting with the electric generator;
a battery manage system, comprising the multiple batteries, connecting with the multiple chargers;
an inverter, comprising a rectifier, wherein the inverter is connected with the multiple batteries and the electric generator independently;
the motor, connecting with the inverter;
the controller, connecting with the electric generator, the multiple batteries and the inverter;
the timer, connecting with the controller;
a processor, connecting with the controller; and
multiple sensors, connecting with the controller;
wherein the multiple sensors inform the controller to adjust a criterion, and the strategy for low-load conditions and the strategy for high-load conditions are inter-switched based on the criterion.

2. The method for controlling energy management for boats and ships as claimed in claim 1, wherein the first state of charge is 80%, the second state of charge is 20%, and the third state of charge is 50%.

3. The method for controlling energy management for boats and ships as claimed in claim 1, wherein the first operation mode comprises a first charging mode and a first electricity-driven mode.

4. The method for controlling energy management for boats and ships as claimed in claim 3, wherein the first charging mode is selected if the state of charge of the multiple batteries is at or below the second state of charge, and wherein the first electricity-driven mode is selected if the state of charge of the multiple batteries is at or above the first state of charge.

5. The method for controlling energy management for boats and ships as claimed in claim 1, wherein the second operation mode comprises a second charging mode, a second electricity-driven mode, and a boost mode.

6. The method for controlling energy management for boats and ships as claimed in claim 5, wherein the second charging mode is selected via the controller if the energy generated by the electric generator is below the threshold or if the state of charge of the multiple batteries is at or below the second state of charge, wherein the second electricity-driven mode is selected via the controller if the energy generated by the electric generator is above the threshold or if the state of charge of the multiple batteries is at or above the third state of charge, and wherein the boost mode is selected if the state of charge of the multiple batteries is between the second state of charge and the third state of charge.

7. The method for controlling energy management for boats and ships as claimed in claim 5, wherein the second charging mode is selected until the state of charge of the multiple batteries is at or above the first state of charge.

8. The method for controlling energy management for boats and ships as claimed in claim 1, wherein the threshold is 25 kW.

9. The method for controlling energy management for boats and ships as claimed in claim 1, wherein the first period is 1 minute, and wherein the second period is 15 minutes.

10. The method for controlling energy management for boats and ships as claimed in claim 1, wherein the criterion is based on one selected from the group consisting of a command, tide data, time data, wind direction data, location data, weather data, hydrologic data, and the combination thereof.

11. The method for controlling energy management for boats and ships as claimed in claim 1, wherein the mode further comprises an engine-driven mode.

12. A method of planning routes for boats and ships, comprising:
selecting a start and a stop by a processor of a ship;
proposing multiple routes by the processor;
simulating an operation of the method for controlling energy management for boats and ships as claimed in claim 1 for each route by the processor; and
selecting the route with the most ideal simulating result from the multiple routes and displaying the route on a display by the processor.

* * * * *